(12) United States Patent  (10) Patent No.: US 9,230,038 B2
Lott et al.  (45) Date of Patent: Jan. 5, 2016

(54) CONTENT FETCHING AND CACHING ON A MOBILE DEVICE

(71) Applicant: Verizon Patent and Licensing Inc., Basking Ridge, NJ (US)

(72) Inventors: Jonathan Lott, Wylie, TX (US); Leena Naidu, Irving, TX (US); Naveena Konathala, Irving, TX (US); Satish Yadav, Henderson, NV (US); Jesus Martinez, Coppell, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 262 days.

(21) Appl. No.: 14/070,918

(22) Filed: Nov. 4, 2013

(65) Prior Publication Data

US 2015/0127693 A1    May 7, 2015

(51) Int. Cl.
*G06F 17/30* (2006.01)
(52) U.S. Cl.
CPC ................................ *G06F 17/30902* (2013.01)
(58) Field of Classification Search
USPC .................. 707/695, 726, 821, 827; 717/170
See application file for complete search history.

(56) References Cited

U.S. PATENT DOCUMENTS

| | | | | |
|---|---|---|---|---|
| 7,072,984 | B1* | 7/2006 | Polonsky | G06F 17/30905 707/E17.121 |
| 7,653,689 | B1* | 1/2010 | Champagne | H04N 21/2402 709/203 |
| 7,715,448 | B2* | 5/2010 | Cheng | H04L 67/20 370/476 |
| 2004/0049579 | A1* | 3/2004 | Ims | H04L 67/2823 709/225 |
| 2005/0166138 | A1* | 7/2005 | Kundu | G06F 17/3089 715/206 |
| 2008/0306815 | A1* | 12/2008 | Dykes | G06Q 30/02 705/14.73 |
| 2010/0035589 | A1* | 2/2010 | Wormald | H04M 1/72561 455/414.1 |
| 2011/0307561 | A1* | 12/2011 | Gao | H04H 20/72 709/206 |
| 2012/0005745 | A1* | 1/2012 | Wei | H04L 29/12594 726/15 |
| 2012/0005746 | A1* | 1/2012 | Wei | H04L 63/0272 726/15 |
| 2012/0150882 | A1* | 6/2012 | Deutsch | G06F 17/30176 707/755 |
| 2012/0271908 | A1* | 10/2012 | Luna | G06F 9/5016 709/216 |
| 2013/0104114 | A1* | 4/2013 | Reiss | G06F 8/65 717/170 |
| 2013/0227461 | A1* | 8/2013 | Berger | G06F 3/0482 715/777 |
| 2013/0238663 | A1* | 9/2013 | Mead | G06F 17/3087 707/792 |
| 2014/0019958 | A1* | 1/2014 | Sherman | G06F 8/61 717/178 |
| 2014/0136973 | A1* | 5/2014 | Kumar | G06F 17/30902 715/274 |

(Continued)

OTHER PUBLICATIONS

Poirot, UIWebView Secrets—Part3—How to Properly Call ObjectiveC From Javascript, Oct. 6, 2010, 5 pages.

*Primary Examiner* — Hanh Thai

(57) ABSTRACT

A device may receive application information associated with an application. The application information may include information associated with a native homepage associated with the application, and may include a single file that includes content associated with the application. The device may receive an indication associated with running the application. The device may present, for display, the native homepage. The native homepage may include information associated with accessing the content. The device may determine that the content, associated with the application, is not current content. The device may obtain the current content, associated with the application, based on determining that the content is not the current content. The device may store the current content based on obtaining the current content. The device may load the current content based on storing the current content. The current content may be loaded to prepare the current content to be displayed to a user.

20 Claims, 11 Drawing Sheets

(56) References Cited

U.S. PATENT DOCUMENTS

| | | | |
|---|---|---|---|
| 2014/0201258 A1* | 7/2014 | Jowett | H04W 4/003 709/203 |
| 2014/0380144 A1* | 12/2014 | Liang | H04L 67/10 715/234 |
| 2015/0066886 A1* | 3/2015 | Wu | G06F 17/30864 707/706 |
| 2015/0074225 A1* | 3/2015 | Nagaraju | H04L 67/02 709/217 |
| 2015/0113504 A1* | 4/2015 | Artzi | G06F 8/60 717/120 |

* cited by examiner

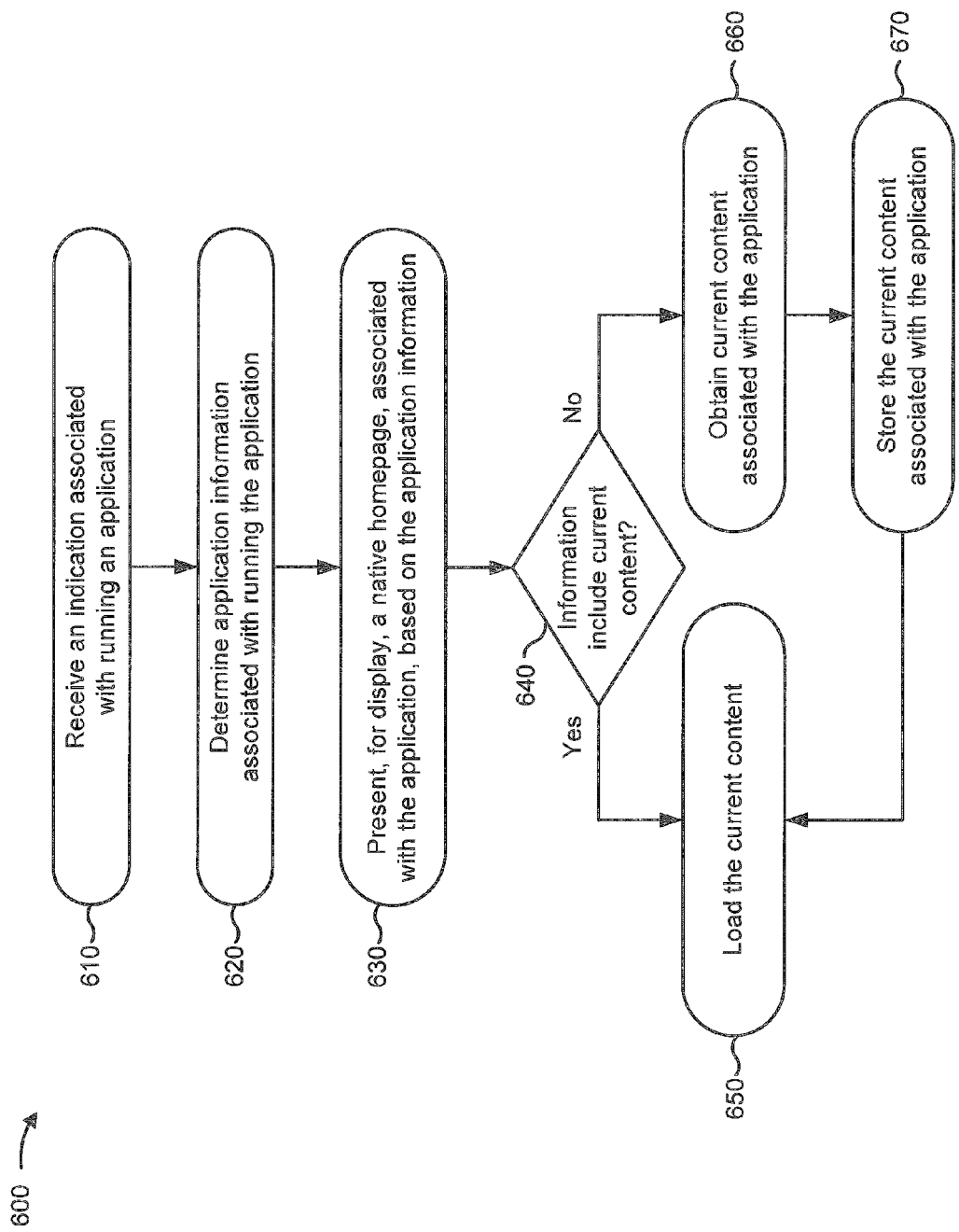

CONTENT FETCHING AND CACHING ON A MOBILE DEVICE

BACKGROUND

An application (e.g., a software application) may be installed on a user device (e.g., a smart phone, a tablet, etc.). The application may allow a user, associated with the user device, to access (e.g., via a network) content associated with the application (e.g., an HTML document associated with a web page) that may be managed and/or stored by another device (e.g., a server device associated with the application).

BRIEF DESCRIPTION OF THE DRAWINGS

FIG. 6 is a flow chart of an example process for displaying a native homepage, associated with an application, and loading current content associated with the application;

DETAILED DESCRIPTION

The following detailed description of example implementations refers to the accompanying drawings. The same reference numbers in different drawings may identify the same or similar elements.

A user of a user device may wish to access content associated with an application (e.g., a hyper-text markup language ("HTML") document that describes a web page, a video file, a text file, etc.) that may be managed and/or stored by a server device associated with the application. However, the user may be forced to wait for the content to be provided (e.g., by the server device) when the user attempts to access the content, which may negatively affect the user's experience associated with the application.

As such, a service provider, associated with the application and/or the user device, may allow the user device to store the content (e.g., such that the user device does not have to wait to receive the content from the server device when running the application). However, the service provider may also ensure that the user device stores a current version of the content (e.g., such that the user will not see outdated content). Implementations described herein may allow a user device to store and display content, associated with an application, and may also allow the user device to ensure that the content is a current version of the content. In this way, a user, associated with the user device, may experience a reduced loading time when accessing and/or viewing current content associated with the application.

Figure 1A:
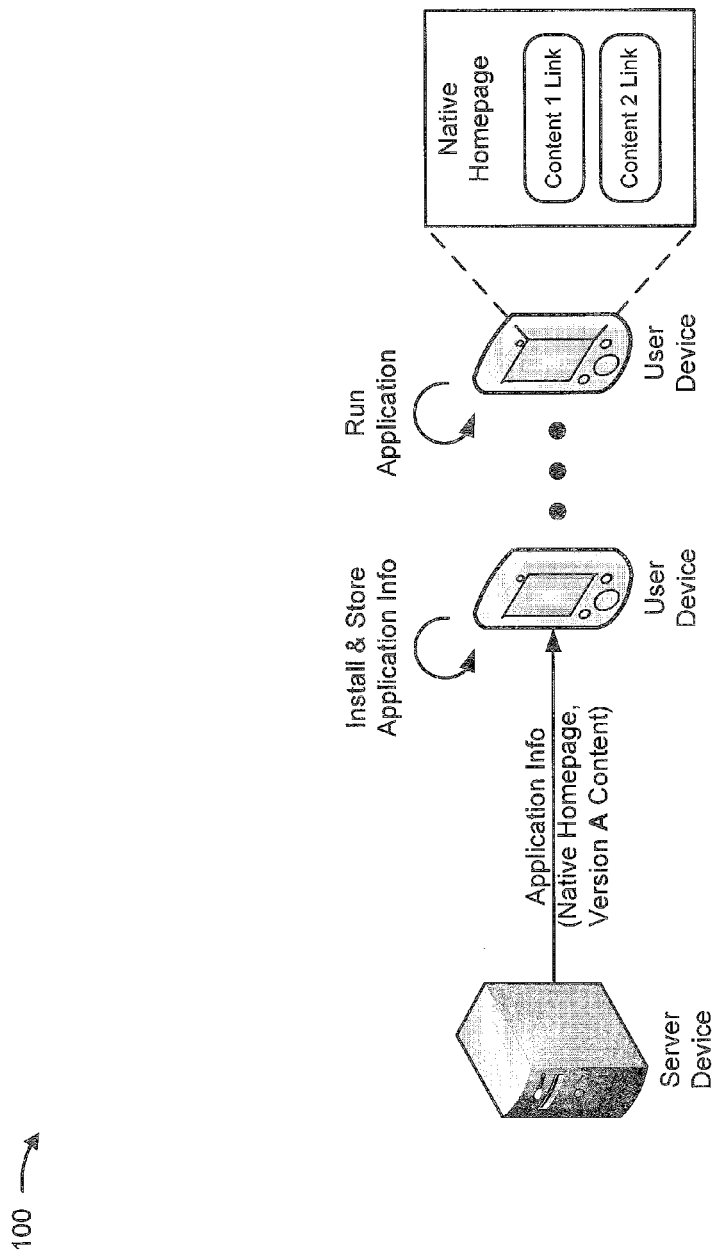
FIGS. 1A and 1B are diagrams of an overview of an example implementation described herein.
Figure 1B:
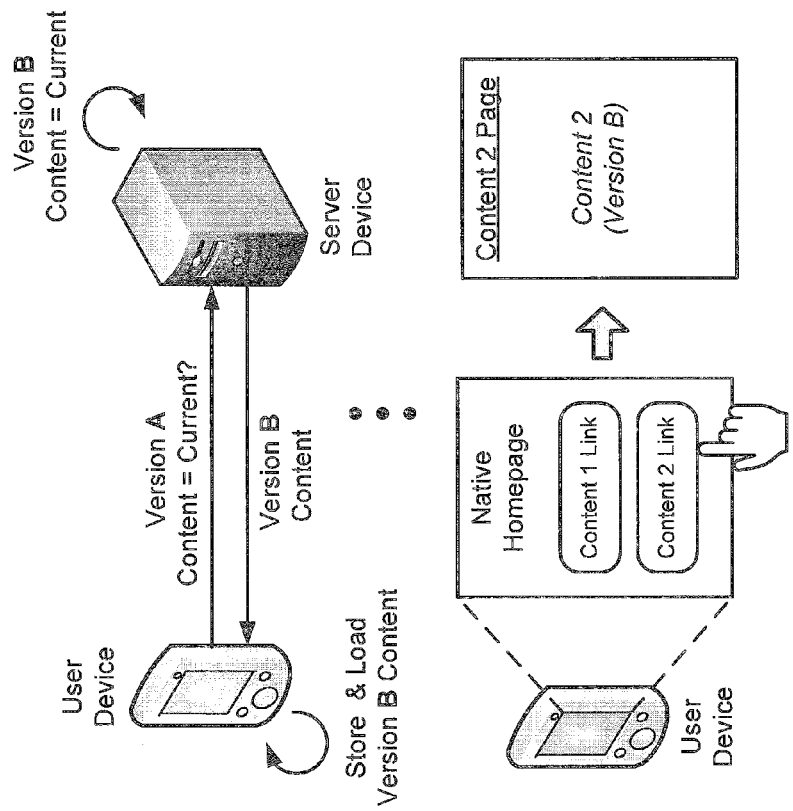

FIGS. 1A and 1B are diagrams of an overview of an example implementation 100 described herein. For the purposes of example implementation 100, assume that a user of a user device wishes to receive and install an application that is managed by a server device. Further, assume that the user device has sent (e.g., via a network) a request, associated with receiving the application, to the server device.

As shown in FIG. 1A, the server device may provide, to the user device, application information associated with the application (e.g., as requested by the user device). As shown, the application information may include information associated with a native homepage (e.g., a homepage developed in a native code that may be displayed each time the application starts), and may include a particular version (e.g., Version A) of content associated with the application. As further shown, the user device may receive the application information, may store the application information, and may install the application (e.g., such that the application may be run by the user device).

As shown, the user device may run the application (e.g., at some time after installing the application), and the user device may display the native homepage (e.g., based on the application information stored by the user device). As shown, the native homepage may include one or more links (e.g., a content 1 link, a content 2 link, etc.), each of which may allow the user device to access content associated with the application (e.g., the content 1 link, when selected, may allow the user to view a web page associated with content 1, etc.).

As shown in FIG. 1B, the user device may (e.g., while displaying the native homepage to the user and waiting for the user to select a link) determine that the user device stores version A of the content associated with the application (e.g., version A of content 1, version A of content 2, etc.), and may query the server device to determine whether version A is the current version of the content. As shown, the server device may determine that version B is the current version of the content (e.g., rather than version A), and may provide the version B content to the user device. As further shown, the user device may receive the version B content, may store the version B content (e.g., in place of the version A content), and may load, into memory, a web page, associated with each link, that includes the version B content (e.g., a web page that includes version B of content 1, a web page that includes version B of content 2) such that each web page is ready to be displayed to the user (e.g., but is hidden from the user until the user selects a link on the native homepage).

As further shown, the user may wish to view the web page associated with content 2, and may select the content 2 link on the native homepage. As shown, the user device may display the content 2 web page (e.g., that includes version B of content 2) without having to receive any additional information from the server device. In this way, a user device may store a current version of content, associated with an application, and the user device may display the content to the user such that the user's experience may be enhanced (e.g., by reducing a loading time associated with the content).

Figure 2:
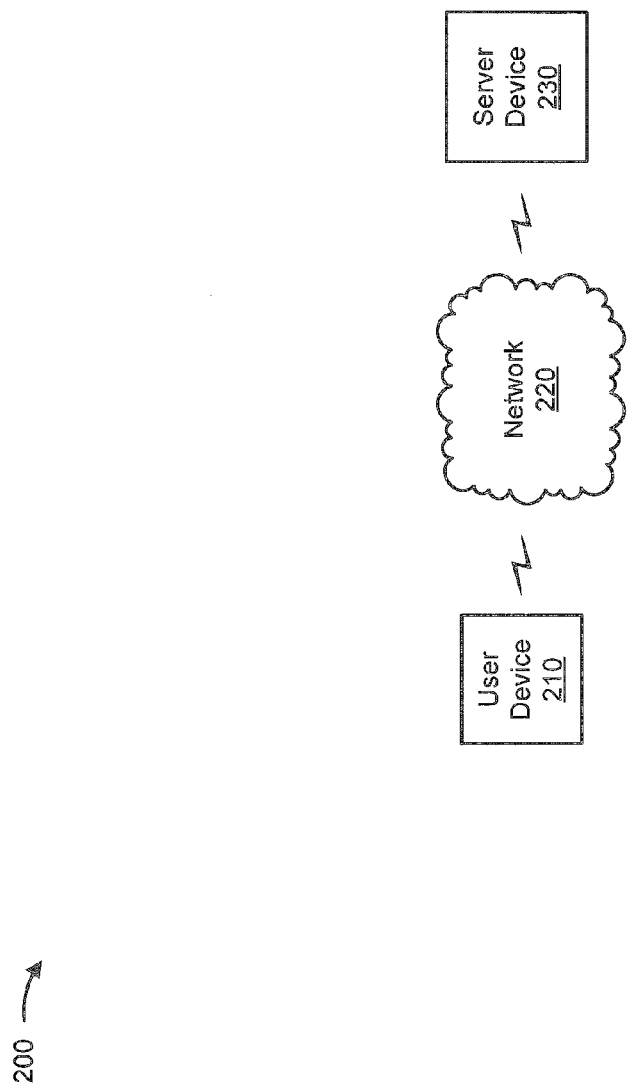
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a network 220, and a server device 230.

User device 210 may include one or more devices capable of communicating with another device via network 220. For example, user device 210 may include a wired communication device, a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a desktop computer, a laptop computer, a tablet computer, and/or a similar device. In some implementations, user device 210 may be capable of receiving, storing, running, and/or processing information associated with an application managed and/or stored by server device 230. Additionally, or alternatively, user device 210 may be capable of receiving input, associated with the application, from a user of user device 210 (e.g., via a touch screen, via a keyboard, etc.).

Network 220 may include one or more wired and/or wireless networks. For example, network 220 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, network 220 may allow user device 210 to communicate with another device, such as server device 230.

Server device 230 may include a device, such as a server, capable of receiving, sending, processing, and/or storing information associated with managing an application. Server device 230 may host and/or execute applications and/or services, such as an application service, and may provide such services to user device 210. For example, server device 230 may include an application server. In some implementations, server device 230 may be capable of receiving, sending, and/or storing content associated with an application and/or a web page managed by server device 230.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
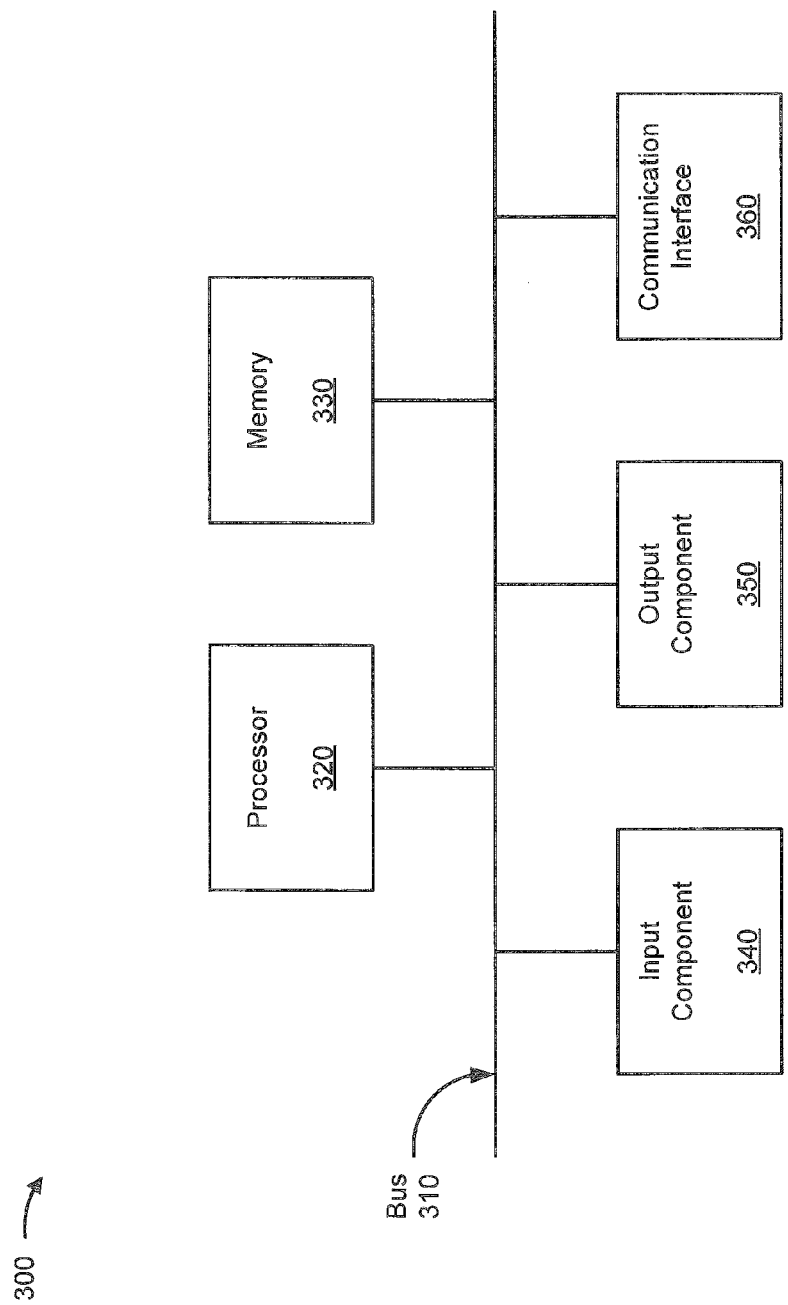
FIG. 3 is a diagram of example components of one or more devices of FIG. 2.

FIG. 3 is a diagram of example components of a device 300. Device 300 may correspond to user device 210 and/or server device 230. Additionally, or alternatively, each of user device 210 and/or server device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
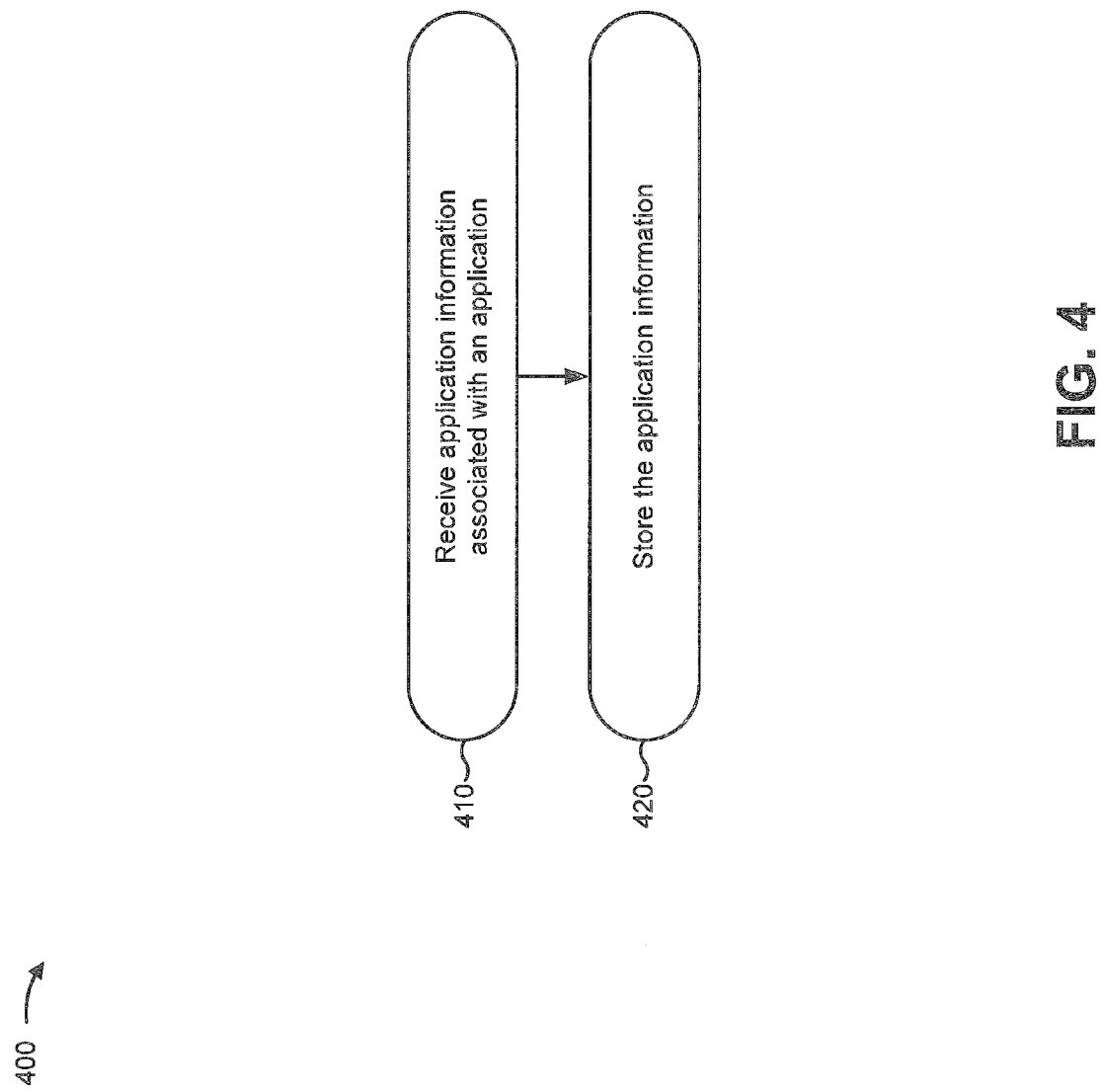
FIG. 4 is a flow chart of an example process for receiving and storing application information associated with an application.

FIG. 4 is a flow chart of an example process 400 for receiving and storing application information associated with an application. In some implementations, one or more process blocks of FIG. 4 may be performed by user device 210.

As shown in FIG. 4, process 400 may include receiving application information associated with an application (block 410). For example, user device 210 may receive application information associated with an application (e.g., information associated with storing and/or running an application). In some implementations, user device 210 may receive the application information when another device (e.g., server device 230) provides the application information to user device 210. Additionally, or alternatively, user device 210 may receive the application information when user device 210 requests the application information, and another device (e.g., server device 230) provides the application information to user device 210 (e.g., when user device 210 requests to receive the application from server device 230).

In some implementations, the application information may include information (e.g., application files) that may allow user device 210 to install and/or run an application. Additionally, or alternatively, the application information may include information associated with a native homepage associated with the application. A native homepage may include a document, written in a native program code (e.g., native program code of user device 210), that is displayed (e.g., via use device 210) to a user when user device 210 runs the application associated with the application information (e.g., the native homepage may be the first page displayed to the user when the application starts). In some implementations, the native homepage may include information that may allow the user to access content, associated with the application (e.g., a web page, a video file, a text file, etc.), that may be managed by another device (e.g., server device 230). For example, the native homepage may include an input mechanism (e.g., a link, a button, etc.) that may allow the user to access an HTML document that describes a web page associated with the application. In some implementations, the native homepage may be loaded (e.g., from a memory location of user device 210) each time user device 210 runs the application (e.g., user device 210 may display the native homepage without receiving any additional information from server device 230).

Additionally, or alternatively, the application information may include content associated with the application. For example, the application information may include a file (e.g., an HTML document that describes a web page, a video file, a text file, an audio file, etc.) associated with the application. In some implementations, the content may include one or more files (e.g., one or more HTML documents) that each describes a portion (e.g., a web page) of the application. In some implementations, the content may include information (e.g., a group of documents) that describes all content associated with the application (e.g., the content may include information that describes all portions of the application).

In some implementations, server device 230 may provide the content in a single file (e.g., a compressed file, an archived file, a ZIP file, etc.) that includes the content. Additionally, or alternatively, the content, received by user device 210, may be associated with a version identifier that may be used (e.g., by server device 230 and/or user device 210) to determine whether the content is a current version of the content. For example, assume that the content (e.g., received and stored by user device 210) is a first version of the content (e.g., as indicated by a version identifier associated with the file), and a second version of the content (e.g., stored by server device 230) is the current version of the content. In this example, the version identifier of the content stored by user device 210 may be used to determine that the content, stored by user device 210, is not a current version of the content.

In some implementations, the content may be used by user device 210 to load and/or display a web page associated with the application. For example, the user may select a link (e.g., displayed on the native homepage), associated with the content, and user device 210 may load and/or display the content, associated with the link, based on the content stored by user device 210 (e.g., user device 210 may load and/or display the content without receiving any additional information from server device 230).

As further shown in FIG. 4, process 400 may include storing the application information (block 420). For example, user device 210 may store the application information received from server device 230. In some implementations, user device 210 may store the application information when user device 210 receives the application information. Additionally, or alternatively, user device 210 may store the application information when user device 210 receives information, indicating that user device 210 is to store the application information, from another device (e.g., server device 230). In some implementations, user device 210 may store the application information in a memory location (e.g., a RAM, a hard disk, etc.) of user device 210. Additionally, or alternatively, user device 210 may store the application information in a memory location associated with running the application (e.g., such that user device 210 may use the application information to run the application).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5:
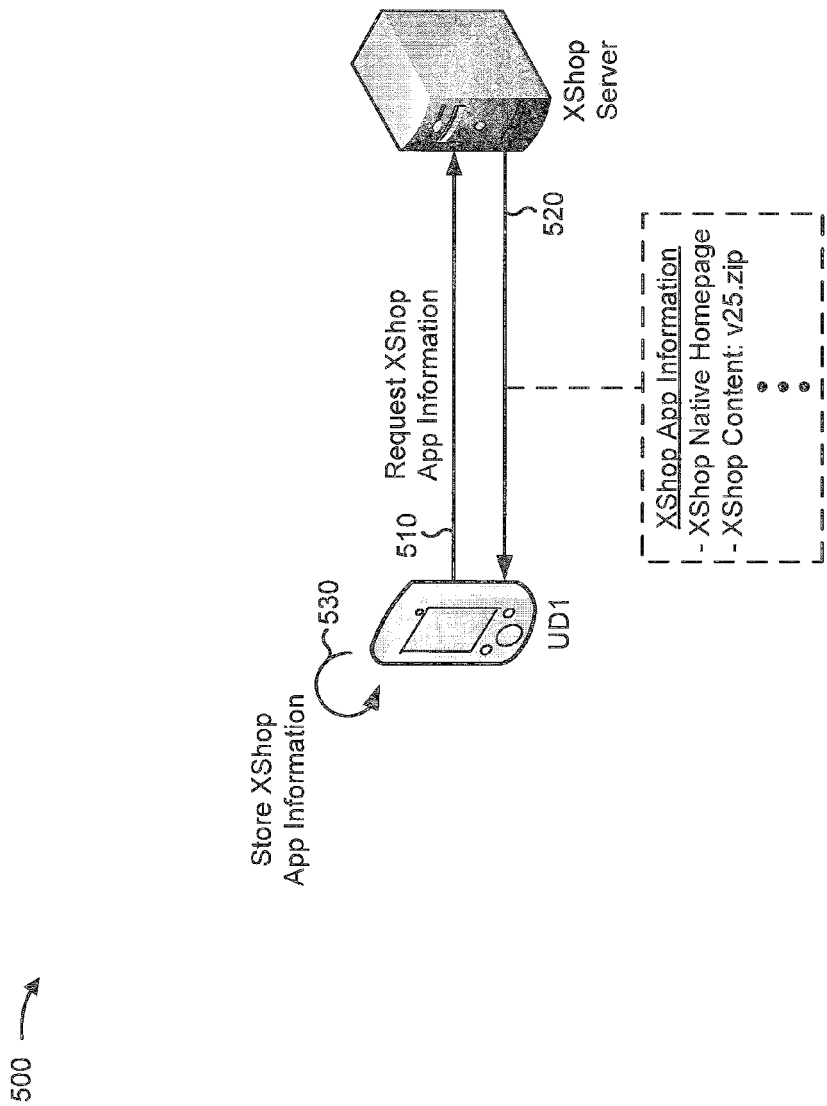
FIG. 5 is a diagram of an example implementation relating to the example process shown in FIG. 4.

FIG. 5 is a diagram of an example implementation 500 relating to the example process 400 shown in FIG. 4. For the purposes of example implementation 500, assume that a user of a user device, UD1, wishes to receive application information associated with an XShop application (e.g. such that UD1 may install and run the XShop application) that is managed by a server device, identified as XShop server.

As shown in FIG. 5, and by reference number 510, UD1 may send, to the XShop server, a request associated with the XShop application information. As shown by reference number 520, the XShop server may receive the request, and may provide the XShop application information to UD1. As shown, the XShop application information may include information associated with an XShop native homepage (e.g., a document coded in a native language of UD1) and may include a ZIP file (e.g., v25.zip) that includes a particular version (e.g., a twenty-fifth version) of content (e.g., one or more HTML documents) associated with the XShop application.

As shown by reference number 530, UD1 may receive the XShop application information, and may store the XShop application information (e.g., such that UD1 may run the XShop application when the user indicates that the XShop application is to be run).

As indicated above, FIG. 5 is provided merely as an example. Other examples are possible and may differ from what was described with regard to FIG. 5.

FIG. 6 is a flow chart of an example process 600 for displaying a native homepage, associated with an application, and loading current content associated with the application. In some implementations, one or more process blocks of FIG. 6 may be performed by user device 210. In some implementations, one or more process blocks of FIG. 6 may be performed by another device or a group of devices separate from or including user device 210, such as server device 230.

As shown in FIG. 6, process 600 may include receiving an indication associated with running an application (block 610). For example, user device 210 may receive an indication associated with running an application stored by user device 210. In some implementations, user device 210 may receive the indication when a user of user device 210 provides the indication associated with running the application. For example, the user may provide, via an input mechanism of user device 210 (e.g., a touch screen, a keyboard, etc.), information indicating that user device 210 is to run an application (e.g., when user device 210 stores information associated with the application). Additionally, or alternatively, user device 210 may receive the indication from another device, associated with the application, such as server device 230.

As further shown in FIG. 6, process 600 may include determining application information associated with running the application (block 620). For example, user device 210 may determine application information associated with running the application. In some implementations, user device 210 may determine the application information, associated with the application, when user device 210 receives (e.g., from the user) the indication associated with running the application (e.g., when user device 210 starts running the application). Additionally, or alternatively, user device 210 may determine the application information, associated with running the application, when user device 210 receives information, indicating that user device 210 is to determine the application information, from another device, such as server device 230.

In some implementations, the application information, associated with running the application, may include information associated with the native homepage of the application, content associated with the application, and/or other information used by user device 210 to run the application. In some implementations, user device 210 may run the application based on the application information.

In some implementations, user device 210 may determine the application information, associated with running the application, based on information stored by user device 210. For example, user device 210 may store application information associated with the application (e.g., a native homepage associated with the application, content associated with the application, other files associated with the application, etc.), and user device 210 may determine the application information, associated with running the application, based on the application information stored by user device 210. Additionally, or alternatively, user device 210 may determine the application information, associated with running the application, based on information stored by another device (e.g., server device 230).

As further shown in FIG. 6, process 600 may include presenting, for display, a native homepage, associated with the application, based on the application information (block 630). For example, user device 210 may present, for display (e.g., via a display screen of user device 210), a native homepage, associated with the application, based on the application information. In some implementations, user device 210 may present the native homepage when user device 210 determines the application information associated with running the application (e.g., when user device 210 starts running the application). Additionally, or alternatively, user device 210 may present the native homepage when user device 210 receives information, indicating that user device 210 is to present the native homepage, from another device, such as server device 230.

In some implementations, user device 210 may present, for display, the native homepage based on the application information stored by user device 210. For example, user device 210 may determine the application information (e.g., that includes information associated with the native homepage), and user device 210 may present, for display, the native homepage based on the application information determined by user device 210. As discussed above, the native homepage may include a document, coded in a native language (e.g., a native language of user device 210), that includes a link to another document (e.g., an HTML document) associated with the application.

As further shown in FIG. 6, process 600 may include determining whether content, included in the application information, is current content (block 640). For example, user device 210 may determine whether the content, included in the application information, is current content. In some implementations, user device 210 may determine whether the content is current when user device 210 displays the native homepage associated with the application (e.g., after user device 210 begins displaying the native homepage). Additionally, or alternatively, user device 210 may determine whether the content is current when user device 210 runs the application (e.g., when user device 210 begins running the application, when user device 210 receives the indication that the application is to be run, etc.). Additionally, or alternatively, user device 210 may determine whether the content is current content at a particular interval of time (e.g., every 30 minutes, every 1 hour, etc.) after user device 210 begins running the application.

Current content, associated with the application, may include information (e.g., an HTML document, a video file, a text file, etc.) that is an up-to-date version of content associated with an application. For example, user device 210 may receive (e.g., from server device 230) content associated with a web page (e.g. an HTML document) of the application, and may store the content. Server device 230 may then modify the content (e.g., stored by server device 230) associated with the application. In this example, the current content is the modified content stored by server device 230 (e.g., rather than the content received and stored by user device 210 prior to the modification by server device 230).

In some implementations, user device 210 may determine whether the content is current content based on information stored by user device 210. For example, the content, stored by user device 210, may be associated with a version identifier (e.g., a string of characters that identifies a version of the content, a version number, a version name, etc.), and user device 210 may determine whether the content is the current version of the content based on sending a request, associated with the version identifier, to server device 230. In this example, server device 230 may store information that identifies a version identifier associated with the current content, may determine whether the content stored by user device 210 is the current content based on the version identifier received from user device 210 (e.g., if the version identifier, stored by user device 210, matches the current version identifier, then the content is the current content, etc.), and may send, to user device 210, information that indicates whether the content, stored by user device 210, is current content.

Additionally, or alternatively, user device 210 may determine whether the content is current content based on information received from server device 230. For example, server device 230 may send a version identifier, associated with the current version of the content, to user device 210, and user device 210 may determine whether the version identifier, received from server device 230, matches a version number of the content stored by user device 210 (e.g., if the version identifier, received from server device 230, matches the version number stored by the user device 210, then the content is the current content).

In some implementations, server device 230 may also provide, to user device 210, information associated with the current content (e.g., when the content, stored by user device 210, is not current), such that user device 210 may obtain the current content. For example, server device 230 may provide a uniform resource locator ("URL") address, associated with the current content, that may allow user device 210 to obtain the current content (e.g., when user device 210 sends requests for the current content based on the URL).

As further shown in FIG. 6, if the content is current content (block 640—YES), then process 600 may include loading the current content (block 650). For example, user device 210 may load the current content associated with the application. In some implementations, user device 210 may load the current content when user device 210 determines that the content, included in the application information (e.g., stored by user device 210) is current content. Additionally, or alternatively, user device 210 may load the current content when user device 210 receives the current content from another device, such as server device 230. Additionally, or alternatively, user device 210 may load the current content when user device 210 receives information, indicating that user device 210 is to load the current content, from another device (e.g., server device 230).

Loading the content may include storing the content in a particular memory location (e.g., a RAM location of user device 210) such that the content is ready for display, if needed. In some implementations, user device 210 may load the current content such that the current content is ready to be displayed to the user (e.g., via user device 210). For example, user device may load information included in the content (e.g., an HTML document) such that information (e.g., a web page) described by the content, is ready to be displayed to the user (e.g., but user device 210 may not display the web page to the user). In this example, the web page, associated with the document, may be displayed when user device 210 receives (e.g., via input from the user) information indicating that the web page is to be displayed (e.g., when the user selects a link, associated with the web page, included on the native homepage). In other words, user device 210 may load the current content in the background (e.g., while user device 210 displays the native homepage), but may not display the current content (e.g., a web page associated with the current content) to the user. In this way, the content, associated with the application, may be preloaded (e.g., loaded before the user requests to view the content) such that the user need not wait for the content to load when the user indicates that the user wishes to view the content.

As further shown in FIG. 6, if the content is not current content (block 640—NO), then process 600 may include obtaining current content associated with the application (block 660). For example, user device 210 may determine that the content, stored by user device 210, is not current, and user device 210 may obtain the current content associated with the application. In some implementations, user device 210 may obtain the current content when user device 210 determines that the content, stored by user device 210, is not current. Additionally, or alternatively, user device 210 may obtain the current content when user device 210 receives information, indicating that user device 210 is to obtain the current content, from another device (e.g., server device 230).

In some implementations, user device 210 may obtain the current content based on sending a request to server device 230. For example, user device 210 may send, to server device 230, a request associated with the current content (e.g., a request that includes a URL associated with the current content), and server device 230 may provide the current content to user device 210 based on the request. Additionally, or alternatively, user device 210 may obtain the current content based on information received from server device 230 (e.g., when server device 230 provides the current content to user device 210). In some implementations, the current content, received by user device 210, may be included in a single file (e.g., a compressed file, an archived file, a ZIP file, etc.).

As further shown in FIG. 6, process 600 may include storing the current content associated with the application (block 670). For example, user device 210 may store the current content received from server device 230. In some implementations, user device 210 may store the current content when user device 210 receives the current content. Additionally, or alternatively, user device 210 may store the current content when user device 210 receives information, indicating that user device 210 is to store the current content, from another device (e.g., server device 230). In some implementations, user device 210 may store the current content in a memory location (e.g., a RAM, a hard disk, etc.) of user device 210. Additionally, or alternatively, user device 210 may store the current content in a memory location that stores non-current content (e.g., user device 210 may overwrite the content, stored by user device 210, that is not current content).

As further shown in FIG. 6, process 600 may include loading the current content (block 650), as discussed above. For example, user device 210 may store the current content, and may load the current content after user device 210 stores the current content received from server device 230, in the manner discussed above.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 700 may be performed in parallel.

Figure 7A:
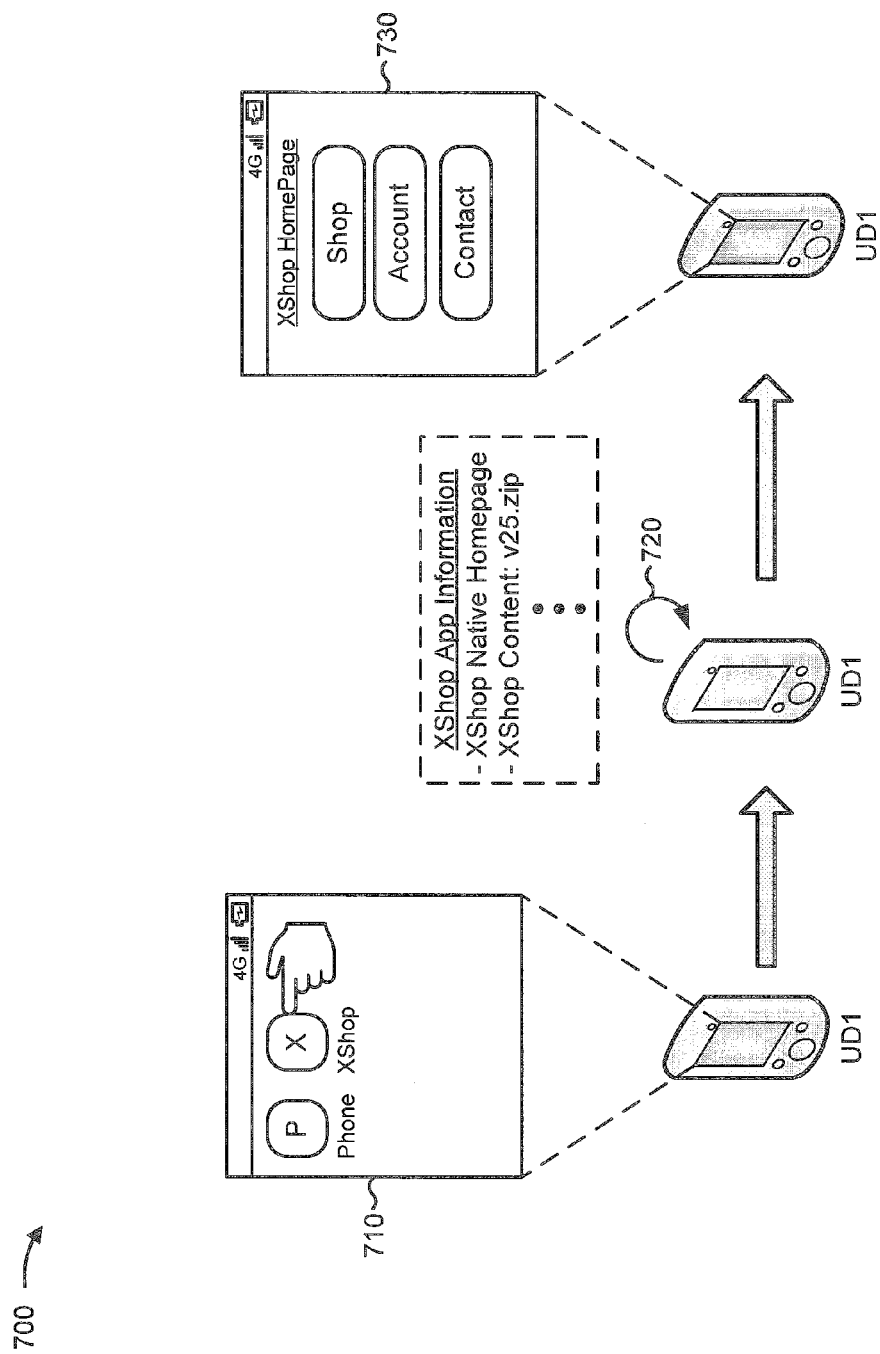
FIGS. 7A and 7B are diagrams of an example implementation relating to the example process shown in FIG. 6.
Figure 7B:
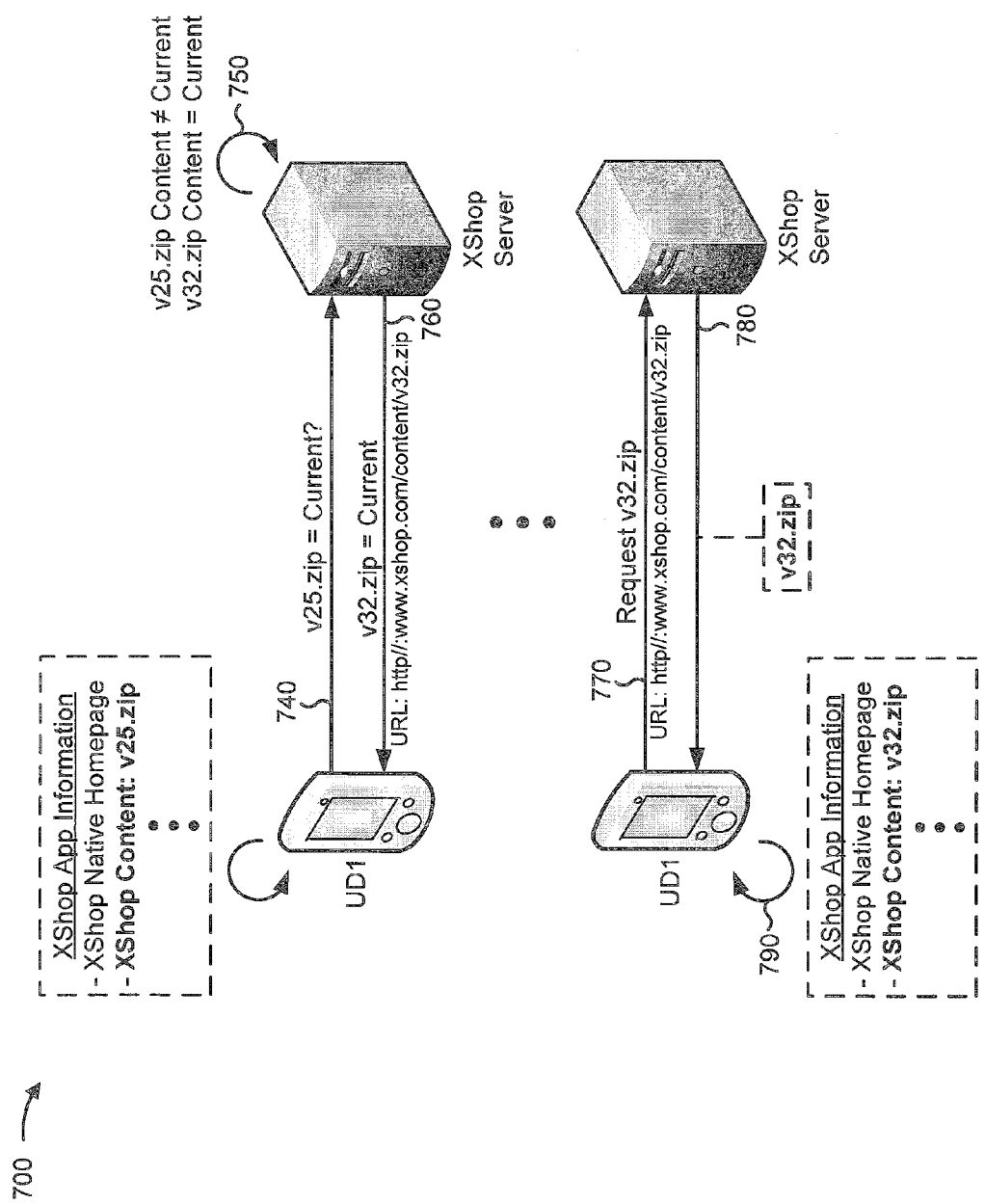

FIGS. 7A and 7B are diagrams of an example implementation 700 relating to example process 600 shown in FIG. 6. For the purposes of example implementation 700, assume that a user device, UD1, stores information associated with an application, XShop, that allows UD1 to run the XShop application (e.g., information associated with an XShop native homepage and content associated with the XShop application). Further, assume that a user of UD1 wishes for UD1 to run the XShop application.

As shown in FIG. 7A, and by reference number 710, the user may provide an indication that UD1 is to run the XShop application, by selecting an XShop icon on a touch screen of UD1. As show by reference number 720, UD1 may determine, based on information stored by UD1, XShop application information associated with running the XShop application. As shown, the XShop application information may include information associated with an XShop native homepage and may include information associated with a twenty-fifth version of content associated with the XShop application (e.g., v25.zip). As shown by reference number 730, UD1 may run the XShop application (e.g., based on the XShop application information determined by UD1), and UD1 may display the XShop native homepage. As shown, the XShop native homepage may include three links (e.g., in the form of a Shop button, an Account button, and a Contact button) associated with content (e.g., three different web pages) associated with the XShop application.

As shown in FIG. 7B, and by reference number 740, UD1 may determine that the XShop content, received by UD1, is identified by the filename v25.zip, and UD1 may send a query to an XShop server (e.g., associated with managing the XShop application) to determine whether the v25.zip content (e.g., the twenty-fifth version) is a current version of the XShop content. As shown by reference number 750, the XShop server may receive the query, and may determine that the current version of the XShop content is a thirty-second version of the content that is identified by the filename v32.zip (e.g., the XShop server may determine that the v25.zip file does not contain the current XShop content). As shown by reference number 760, the XShop server may provide, to UD1, information indicating that v32.zip is the current version of the XShop content, and may provide a URL (e.g., http//:www.xshop.com/content/v32.zip) that may allow UD1 to obtain the v32.zip XShop content.

As further shown in FIG. 7B, and by reference number 770, UD1 may receive information that indicates that the thirty-second version of the content is the current version of the content, may receive the URL from the XShop server, and may send, to the XShop server, a request including the URL associated with the current XShop content (e.g., v32.zip). As shown by reference number 780, the XShop server may receive the request, and may provide the v32.zip XShop content to UD1. As shown by reference number 790, UD1 may receive the v32.zip XShop content, may store the v32.zip XShop content, and may load the v32.zip XShop content, such that the user device may not display the content (e.g., the v32.zip XShop content may be loaded in the background while the XShop native homepage is being displayed to the user).

As indicated above, FIGS. 7A and 7B are provided merely as an example. Other examples are possible and may differ from what was described with regard to FIGS. 7A and 7B.

Figure 8:
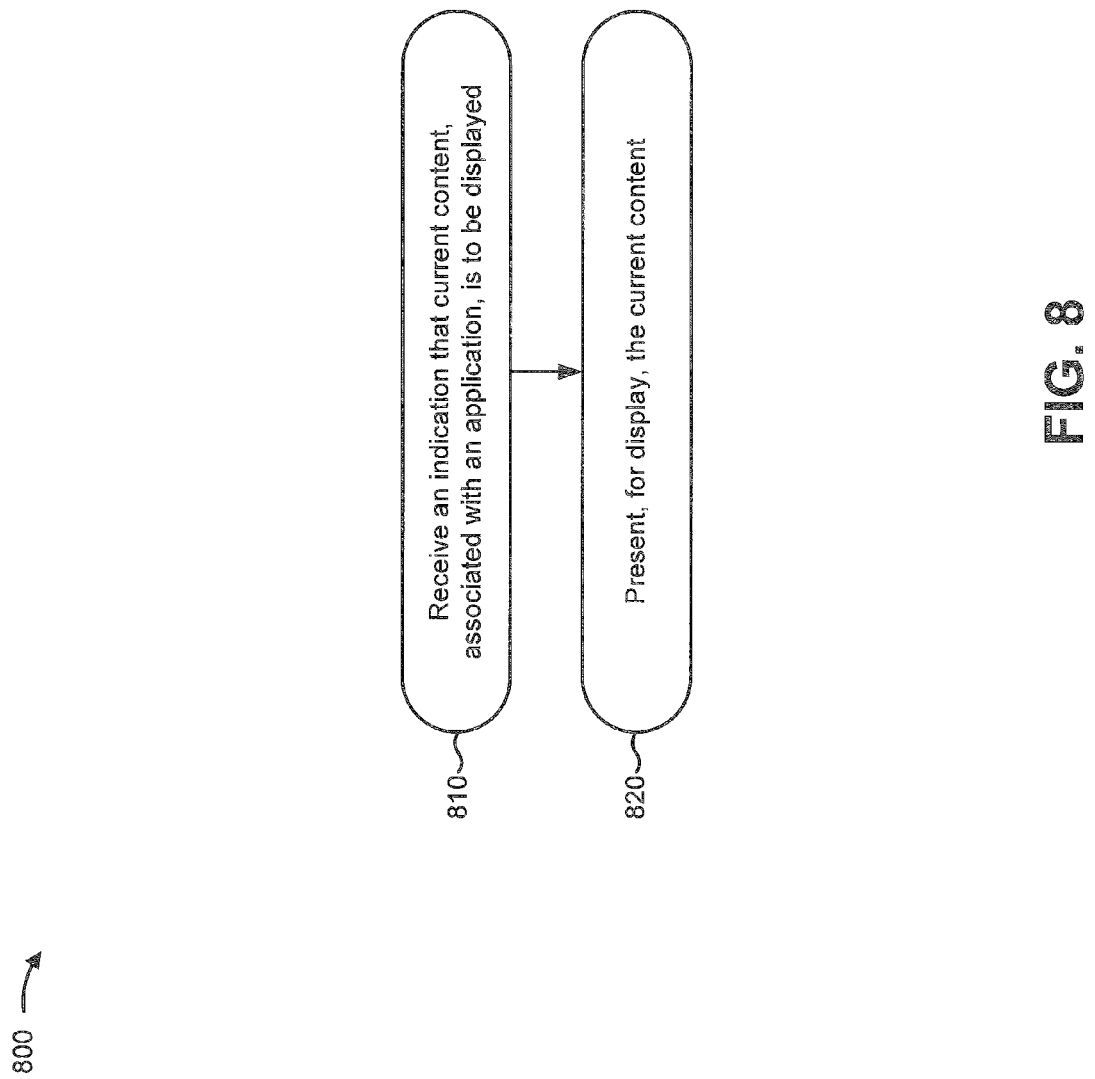
FIG. 8 is a flow chart of an example process for displaying current content associated with an application.

FIG. 8 is a flow chart of an example process 800 for displaying current content associated with an application. In some implementations, one or more process blocks of FIG. 8 may be performed by user device 210.

As shown in FIG. 8, process 800 may include receiving an indication that current content, associated with an application, is to be displayed (block 810). For example, user device 210 may receive an indication that current content, associated with an application running on user device 210, is to be displayed by user device 210. In some implementations, user device 210 may receive the indication from a user of user device 210 via an input mechanism (e.g., a touch screen, a keyboard, etc.) of user device 210. Additionally, or alternatively, user device 210 may receive the indication from another device, such as server device 230.

In some implementations, the indication may be associated with a web page that is described by current content associated with an application. For example, user device 210 may display (e.g., on a native homepage associated with the application) information that may allow the user to access a web page associated with the current content (e.g., a link to the web page described by an HTML document included in the current content), and the user may indicate (e.g., by selecting the link) that the user wishes to view the web page. Additionally, or alternatively, the indication may be associated with another type of file that is included in the current content (e.g., a video file, a text file, etc.).

As further shown in FIG. 8, process 800 may include presenting, for display, the current content (block 820). For example, user device 210 may present, for display, the current content via a display screen of user device 210. In some implementations, user device 210 may present, for display, the current content when user device 210 receives, from the user, an indication indicating that the current content is to be displayed. Additionally, or alternatively, user device 210 may present the current content when user device 210 receives information, indicating that the current content is to be presented, from another device (e.g., server device 230).

In some implementations, user device 210 may present, for display, the current content based on loading the current content (e.g., when user device 210 has loaded the content while waiting for the user to select a link on the native homepage). In some implementations, user device 210 may present, for display, the current content in the form of a web page described by the current content. For example, the current content may include an HTML document that describes a web page associated with the application, and user device 210 may present the web page (e.g., based on the HTML document that describes the web page).

In some implementations, the user of user device 210 may navigate from a first web page, associated with a first portion of current content, to a second web page, associated with a second portion of the current content. For example, the user may indicate (e.g., via a touch screen of user device 210) that the user wishes to view a first web page, and the first web page may include a link to a second webpage. In this example, the user may select the link to the second web page, and user device 210 may present, for display, the second webpage (e.g., without returning to the native homepage and without receiving additional information from server device 230).

In some implementations, the user of user device 210 may navigate from a web page, associated with the current content, back to the native homepage (e.g., user device 210 may once again present, for display, the native homepage), and user device 210 may determine whether the content, stored by user device 210, is current content (e.g., user device 210 may return to block 640, as discussed above).

In some implementations, user device 210 may present, for display, the current content based on communication between a native program code, associated with user device 210, and a program code associated with the current content, such as HTML code. For example, the native program code, when executed by user device 210, may inject information (e.g., a Javascript command), associated with the native program code, into HTML code of a web page associated with the current content (e.g., such that the Javascript command is injected into the HTML code of the web page and the display of the web page is modified based on the Javascript command). As another example, the HTML program code, when executed by user device 210, may provide information (e.g., a Javascript command associated with the HTML program code of the web page) to the native code by providing a URL that may include one or more parameters. In this example, the native code may receive the URL, may read the parameters included in the URL, and may modify the native code, accordingly.

In some implementations, user device 210 may present, for display, current content associated with redirecting the user to another application. For example, user device 210 may present information associated with a first application (e.g., a button, a link, etc.), that, when selected by the user, may redirect the user to a second application (e.g., when the first application is launched by user device 210, user device 210 may present, for display, current content in the form of a link that, when selected by the user, causes user device 210 to download and/or run a second application). In some implementations, user device 210 may detect whether the second application is installed, and may present current content based on determining whether the second application is installed (e.g., user device 210 may display a link associated with running the application when user device 210 determines that the second application is installed, user device 210 may present, for display, information associated with downloading the application when user device 210 determines that the second application is not installed, etc.).

Although FIG. 8 shows example blocks of process 800, in some implementations, process 800 may include additional blocks, different blocks, fewer blocks, or differently arranged blocks than those depicted in FIG. 8. Additionally, or alternatively, one or more of the blocks of process 800 may be performed in parallel.

Figure 9:
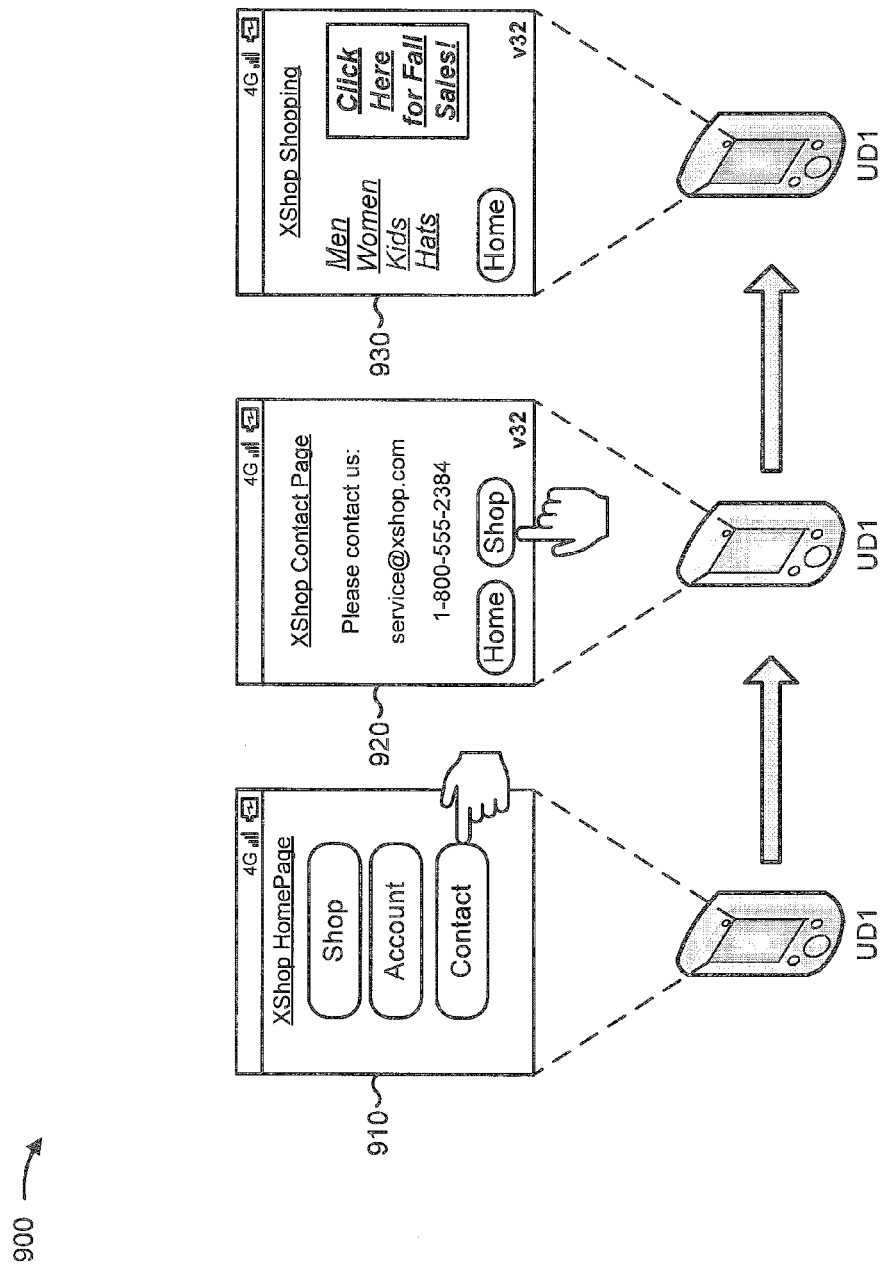
FIG. 9 is a diagram of an example implementation relating to the example process shown in FIG. 8.

FIG. 9 is a diagram of an example implementation 900 relating to the example process 800 shown in FIG. 8. For the purposes of example implementation 900, assume that a user device, UD1, has received current content (e.g., a thirty-second version of content) associated with an XShop application, and that UD1 has loaded the three web pages (e.g., a Shopping web page, an Account web page, and a Contact web page), associated with the XShop application, based on the current content. Further assume that UD1 loaded the three web pages while UD1 was displaying an XShop native homepage (e.g., UD1 loaded the three web pages while waiting for the user to select a link, associated with one of the three web pages, included on the native homepage).

As shown in FIG. 9, and by reference number 910, the user may wish to view the Contact web page associated with the XShop application, and may select (e.g., via a touch screen of UD1) a link associated with the Contact web page. As shown by reference number 920, UD1 may display the Contact web page without receiving additional information from an XShop server (e.g., since UD1 stores the current content, associated with the Contact web page, and has already loaded the Contact web page). As shown, the Contact web page may indicate a version number (e.g., "v32"), associated with the Contact web page displayed by UD1. As shown by reference number 930, the user may indicate that the user wishes to view the XShop Shopping web page, and UD1 may display the Shopping web page without receiving information from the XShop server (e.g., since UD1 stores the current content, associated with the Shopping web page, and has already loaded the Shopping web page). As shown, the Shopping web page may indicate a version number (e.g., "v32"), associated with the Shopping web page displayed by UD1. In this way, UD1 may continue to display various web pages, associated with XShop application, without receiving additional information from the XShop server (e.g., since UD1 stores the current content associated with the XShop application), and the user's experience with the application may be enhanced (e.g., since the user will not have to wait for the current content to be received and/or loaded by UD1).

As indicated above, FIG. 9 is provided merely as an example. Other examples are possible and may differ from what was described with regard to FIG. 9.

Implementations described herein may allow a user device to store and display content, associated with an application, and may also allow the user device to ensure that the content is a current version of the content. In this way, a user, associated with the user device, may experience a reduced loading time when accessing and/or viewing the current content associated with the application.

The foregoing disclosure provides illustration and description, but is not intended to be exhaustive or to limit the implementations to the precise form disclosed. For example, example implementations described herein discuss content displayed in the form of a web page, however, the content may include information other than a web page, such as text, audio, video, or another type of content. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
  receive application information associated with an application,
    the application information including information associated with a native homepage associated with the application, and
    the application information including a single file that includes content associated with the application;
  receive an indication associated with running the application;
  present, for display, the native homepage, associated with the application, based on receiving the indication,
    the native homepage including information associated with accessing the content;
  determine that the content, associated with the application, is not current content;
  obtain the current content, associated with the application, based on determining that the content is not the current content;
  store the current content based on obtaining the current content; and
  load the current content based on storing the current content,
    the current content being loaded to prepare the current content to be displayed to a user.

2. The device of claim 1, where the one or more processors are further to:
  determine a first version identifier associated with the content, based on the application information;
  receive a second version identifier, associated with the current content,
    the first version identifier being different than the second version identifier; and
  where the one or more processors, when determining that the content is not the current content, are further to:

determine that the content is not the current content based on the second version identifier being different than the first version identifier.

3. The device of claim 1, where the one or more processors are further to:
provide a version identifier, associated with the content, to a server device associated with the application;
receive information indicating that the version identifier is not associated with the current content; and
where the one or more processors, when determining that the content is not the current content, are further to:
determine that the content is not the current content based on receiving the information indicating that the version identifier is not associated with the current content.

4. The device of claim 1, where the one or more processors are further to:
receive information that identifies the current content;
send a request, associated with the current content, based on the information that identifies the current content;
receive a response to the request,
the response including a single file that includes the current content; and
where the one or more processors, when obtaining the current content, associated with the application, are further to:
obtain the current content from the single file that includes the current content.

5. The device of claim 1, where the one or more processors, when loading the current content, are further to:
load the current content such that a web page, associated with the current content, is not displayed to the user;
receive an indication, associated with the native homepage, that the web page, associated with current content, is to be displayed to the user; and
present, for display, the web page to the user based on receiving the indication associated with the native homepage.

6. The device of claim 5, where the one or more processors are further to:
receive, after presenting the web page to the user and after loading the current content, an indication, associated with the web page, that another web page is to be displayed to the user; and
present, for display, the other web page to the user based on receiving the indication associated with the web page.

7. The device of claim 1, where the one or more processors are further to:
delete the content, associated with the application, that is not the current content; and
where the one or more processors, when storing the current content, are further to:
store the current content based on deleting the content that is not the current content.

8. A computer-readable medium storing instructions, the instructions comprising:
one or more instructions that, when executed by one or more processors, cause the one or more processors to:
receive application information associated with an application,
the application information including information associated with a native homepage of the application and including a file that includes content associated with the application;
determine that the application is to be executed;
present, for display, the native homepage, associated with the application, based on determining that the application is to be executed,
the native homepage including information that allows a user to access the content;
determine that the content, associated with the application, is not current content;
receive the current content based on determining that the content is not the current content;
save the current content based on receiving the current content; and
prepare the current content based on storing the current content,
the current content being prepared to be displayed to the user without displaying the current content to the user.

9. The computer-readable medium of claim 8, where the one or more instructions, when executed by the one or more processors, further cause the one or more processors to:
determine a first version identifier associated with the content, based on the application information;
receive a second version identifier, associated with the current content,
the first version identifier being different than the second version identifier; and
where the one or more instructions, that cause the one or more processors to determine that the content is not the current content, further cause the one or more processors to:
determine that the content is not the current content based on the second version identifier being different than the first version identifier.

10. The computer-readable medium of claim 8, where the one or more instructions, when executed by the one or more processors, further cause the one or more processors to:
provide a version identifier, associated with the content, to a server device associated with the application;
receive information indicating that the version identifier is not associated with the current content; and
where the one or more instructions, that cause the one or more processors to determine that the content is not the current content, further cause the one or more processors to:
determine that the content is not the current content based on receiving the information indicating that the version identifier is not associated with the current content.

11. The computer-readable medium of claim 8, where the one or more instructions, when executed by the one or more processors, further cause the one or more processors to:
receive information that identifies the current content;
send a request, associated with the current content, based on the information that identifies the current content;
receive a response to the request,
the response including a file that includes the current content; and
where the one or more instructions, that cause the one or more processors to receive the current content further cause the one or more processors to:
receive the current content from the file that includes the current content.

12. The computer-readable medium of claim 8, where the one or more instructions, when executed by the one or more processors, further cause the one or more processors to:

receive an indication, associated with the native homepage and after preparing the current content, that a web page, associated with current content, is to be displayed to the user; and present, for display, the web page to the user based on receiving the indication associated with the native homepage.

13. The computer readable-medium of claim 12, where the one or more instructions, when executed by the one or more processors, further cause the one or more processors to:

receive, after presenting the web page to the user and after preparing the current content, an indication, associated with the web page, that another web page is to be displayed to the user; and present, for display, the other web page to the user based on receiving the indication associated with the web page.

14. The computer-readable medium of claim 8, where the one or more instructions, when executed by the one or more processors, further cause the one or more processors to:

delete the content, associated with the application, that is not the current content; and where the one or more instructions, that cause the one or more processors to save the current content, further cause the one or more processors to:

save the current content based on deleting the content that is not the current content.

15. A method, comprising:

receiving, by a device, application information associated with an application, the application information including information associated with a native homepage of the application, and the application information including content associated with the application;

receiving, by the device, an indication that the application is to be run;

presenting, for display, by the device, the native homepage, associated with the application, the native homepage including information that identifies a web page associated with the content;

determining, by the device, that the content, included in the application information, is not current content;

retrieving, by the device, the current content, associated with the application, based on determining that the content is not the current content;

storing, by the device, the current content based on retrieving the current content; and loading, by the device, the current content based on storing the current content, the current content being loaded such that the web page, associated with the current content, is ready to be displayed to a user.

16. The method of claim 15, further comprising:

determining a first version identifier associated with the content, based on the application information;

receiving a second version identifier, associated with the current content, the first version identifier being different than the second version identifier; and where determining that the content is not the current content further comprises:

determining that the content is not the current content based on the second version identifier being different than the first version identifier.

17. The method of claim 15, further comprising:

providing a version identifier, associated with the content, to a server device associated with the application;

receiving information indicating that the version identifier is not associated with the current content; and where determining that the content is not the current content further comprises:

determining that the content is not the current content based on receiving the information indicating that the version identifier is not associated with the current content.

18. The method of claim 15, further comprising:

receiving information that identifies the current content;

sending a request, associated with the current content, based on the information that identifies the current content;

receiving a response to the request, the response including the current content; and where retrieving the current content associated with the application further comprises:

retrieving the current content based on the response.

19. The method of claim 15, where loading the current content further comprises:

loading the current content such that a the web page, associated with the current content, is not displayed to the user;

receiving an indication, associated with the native homepage, that the web page, associated with current content, is to be displayed to the user; and presenting, for display, the web page to the user based on receiving the indication associated with the native homepage.

20. The method of claim 15, further comprising:

deleting the content, associated with the application, that is not the current content; and where storing the current content further comprises:

storing the current content based on deleting the content that is not the current content.

* * * * *